United States Patent
Park

(10) Patent No.: US 11,449,321 B2
(45) Date of Patent: Sep. 20, 2022

(54) CONTROLLER AND METHOD FOR INSTALLING AND EXECUTING BRIDGE FIRMWARE DATA

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/149,386

(22) Filed: Jan. 14, 2021

(65) Prior Publication Data

US 2022/0012033 A1 Jan. 13, 2022

(30) Foreign Application Priority Data

Jul. 7, 2020 (KR) ........................ 10-2020-0083528

(51) Int. Cl.
*G06F 8/61* (2018.01)
*G06F 3/06* (2006.01)

(52) U.S. Cl.
CPC .............. *G06F 8/61* (2013.01); *G06F 3/0604* (2013.01); *G06F 3/0656* (2013.01); *G06F 3/0679* (2013.01); *G06F 8/62* (2013.01)

(58) Field of Classification Search
CPC ... G06F 8/61–63; G06F 3/0604; G06F 3/0656
USPC ................................. 717/168–175
See application file for complete search history.

(56) References Cited

U.S. PATENT DOCUMENTS

| | | | | |
|---|---|---|---|---|
| 6,357,021 B1* | 3/2002 | Kitagawa | ................... | G06F 8/65 714/38.1 |
| 7,055,148 B2* | 5/2006 | Marsh | ........................ | G06F 8/65 713/2 |
| 7,089,547 B2* | 8/2006 | Goodman | .................. | G06F 8/65 713/1 |
| 7,590,835 B1* | 9/2009 | Nallagatla | ........... | G06F 9/44505 710/8 |
| 7,797,696 B1* | 9/2010 | Nallagatla | ................. | G06F 8/65 717/168 |
| 8,214,653 B1* | 7/2012 | Marr | ..................... | G06F 21/629 713/150 |

(Continued)

FOREIGN PATENT DOCUMENTS

KR 10-2019-0036779 4/2019
KR 10-2019-0101171 8/2019

OTHER PUBLICATIONS

Lee etal, "Binding Hardware and Software to Prevent Firmware Modification and Device Counterfeiting", ACM, pp. 70-81 (Year: 2016).*

(Continued)

*Primary Examiner* — Anil Khatri
(74) *Attorney, Agent, or Firm* — IP & T Group LLP

(57) ABSTRACT

A controller that controls a memory device, includes: a buffer memory; and a processor suitable for: temporarily storing bridge firmware data in the buffer memory when the bridge firmware data is received together with a previous firmware update request, installing and executing bridge firmware based on the bridge firmware data after approved retention firmware data is received together with a subsequent firmware update request, installing the approved retention firmware after execution of the bridge firmware, and removing the installed bridge firmware.

13 Claims, 4 Drawing Sheets

(56) References Cited

U.S. PATENT DOCUMENTS

| | | | | |
|---|---|---|---|---|
| 8,495,618 | B1* | 7/2013 | Inbaraj | G06F 8/654 |
| | | | | 717/172 |
| 8,713,553 | B2* | 4/2014 | Suzuki | G06F 11/2089 |
| | | | | 717/168 |
| 8,972,973 | B2* | 3/2015 | Cavalaris | G06F 8/65 |
| | | | | 717/172 |
| 9,292,611 | B1* | 3/2016 | Gysin | G06F 16/9554 |
| 9,395,968 | B1* | 7/2016 | Nallagatla | G06F 8/71 |
| 9,703,295 | B1* | 7/2017 | Neal, III | B64C 31/02 |
| 9,727,390 | B1* | 8/2017 | Righi | G06F 3/123 |
| 10,838,705 | B2* | 11/2020 | Riedl | H04L 67/12 |
| 10,860,305 | B1* | 12/2020 | Harland | H03K 19/177 |
| 10,997,297 | B1* | 5/2021 | Lin | H04L 9/30 |

OTHER PUBLICATIONS

Gao et al., "EM-Fuzz: Augmented Firmware Fuzzing via Memory Checking", IEEE, pp. 3420-3432 (Year: 2020).*

Ahn et al, "Automated Firmware Testing using Firmware-Hardware Interaction Patterns", ACM, pp. 1-10 (Year: 2014).*

Li et al, "VIPER: Verifying the Integrity of PERipherals' Firmware", ACM, pp. 3-16 (Year: 2011).*

Greene, "Agile Methods Applied to Embedded Firmware Development", IEEE, pp. 1-7 (Year: 2004).*

Zandberg et al, "Secure Firmware Updates for Constrained IoT Devices Using Open Standards: A Reality Check", IEEE, pp. 71907-71920 (Year: 2019).*

Choi et al, "Blockchain-Based Distributed Firmware Update Architecture for IoT Devices", IEEE, pp. 37518-37525 (Year: 2020).*

* cited by examiner

CONTROLLER AND METHOD FOR INSTALLING AND EXECUTING BRIDGE FIRMWARE DATA

CROSS-REFERENCE TO RELATED APPLICATION(S)

The present application claims priority under 35 U.S.C. § 119(a) to Korean Patent Application No, 10-2020-0083528, filed on Jul. 7, 2020, the disclosure of which is incorporated herein by reference in its entirety.

BACKGROUND

1. Field

Various embodiments of the present disclosure relate to a controller that controls a memory device.

2. Description of the Related Art

The computer environment paradigm has been transitioning to ubiquitous computing, which enables computing systems to be used anytime, anywhere. As a result, use of portable electronic devices such as mobile phones, digital cameras, and laptop computers has rapidly increased. These portable electronic devices generally use a memory system having one or more memory devices for storing data.

A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSDs).

SUMMARY

Various embodiments of the present disclosure are directed to a controller that allows bridge firmware, which need only be temporarily executed, to be removed from a memory system after the bridge firmware accomplishes its purpose, and an operating method of the controller.

In accordance with an embodiment, a controller that controls a memory device, includes: a buffer memory; and a processor suitable for: temporarily storing bridge firmware data in the buffer memory when the bridge firmware data is received together with a previous firmware update request, installing and executing bridge firmware based on the bridge firmware data after approved retention firmware data is received together with a subsequent firmware update request, installing the approved retention firmware after execution of the bridge firmware, and removing the installed bridge firmware.

In accordance with an embodiment, an operating method of a controller that controls a memory device, the operating method includes: temporarily storing bridge firmware data in a buffer memory, included in the controller, when the bridge firmware data is received together with a previous firmware update request; installing and executing bridge firmware based on the bridge firmware data after approved retention firmware data is received together with a subsequent firmware update request; installing the approved retention firmware after the execution of the bridge firmware; and removing the installed bridge firmware.

In accordance with an embodiment, an operating method of a controller, the operating method includes: pre-installing bridge firmware and retention firmware; installing the bridge firmware after the retention firmware is pre-installed; and removing the bridge firmware while or after installing the retention firmware after one-time execution of the bridge firmware.

DETAILED DESCRIPTION

Various embodiments of the present disclosure are described below in detail with reference to the accompanying drawings. In the following description, description of well-known detail may be omitted so as not to obscure the subject matter of the invention, Throughout the specification, reference to "an embodiment," "another embodiment" or the like is not necessarily to only one embodiment, and different references to any such phrase are not necessarily to the same embodiment(s), The term "embodiments" when used herein does not necessarily refer to all embodiments.

Figure 1:
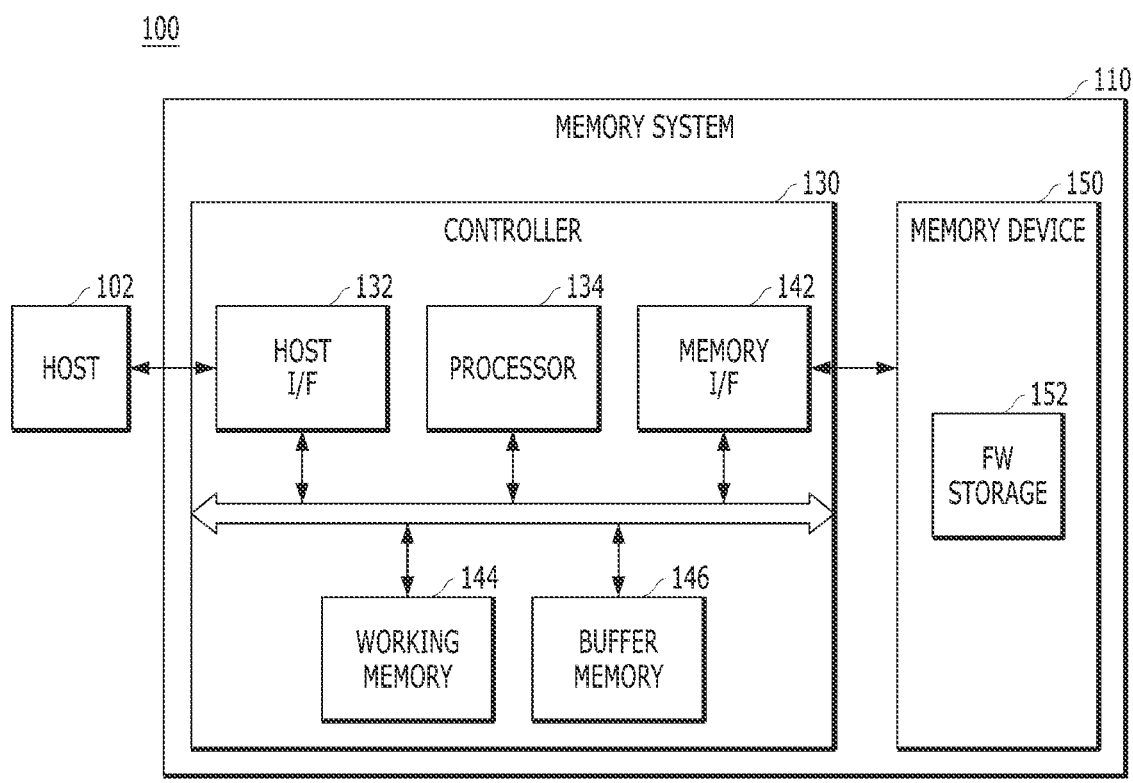
FIG. 1 is a block diagram schematically illustrating an example of a data processing system including a memory system in accordance with an embodiment.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and/or laptop computer, or any of various non-portable electronic devices such as a desktop computer, a game machine, a television (TV), and/or a projector.

The host 102 may include at least one operating system (OS), which may manage and control overall function and operation of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and/or a memory stick. The MMC may include an embedded MMC (eMMC), reduced size MMC (RS-MMC) and micro-MMC. The SD card may include a mini-SD card and micro-SD card.

The memory system 110 may be embodied by any of various types of storage devices. Examples of such storage devices include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In another embodiment, the controller 130 and the memory device 150 may be integrated as one semiconductor device to constitute a memory card, such as a personal computer memory card international association (PCMCIA) card, compact flash (CF) card, a smart media (SM) card, a memory stick, a multimedia card (MMC) including reduced size MMC (RS-MMC) and micro-MMC, secure digital (SD) card including mini-SD card, micro-SD card and SDHC card, or a universal flash storage (UFS) device.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks, each of which may include a plurality of pages, and each of the pages may include a plurality of memory cells coupled to a word line. In an embodiment, the memory device 150 may be a flash memory. The flash memory may have a 3-dimensional (3D) stack structure.

The memory device 150 may include a firmware storage 152. Firmware code that may be driven by the controller 130 to control the memory device 150 may be stored in the firmware storage 152. For example, some of the memory blocks in the memory device 150 may be designated as the firmware storage 152.

Firmware stored in the firmware storage 152 may be updated while the memory system 110 is being driven. For example, the memory system 110 may receive new firmware from the host 102, and store the new firmware in the firmware storage 152.

The controller 130 may control the memory device 150 in response to a request from the host 102, For example, the controller 130 may provide data read from the memory device 150 to the host 102, and store data provided from the host 102 into the memory device 150. For this operation, the controller 130 may control read, program and erase operations of the memory device 150.

The controller 130 may include a host interface (I/F) 132, a processor 134, a memory I/F, a memory 144 and a buffer memory 146, all operatively coupled via an internal bus.

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and/or integrated drive electronics (IDE).

The host I/F 132 may be driven through firmware referred to as a host interface layer (HIL) in order to exchange data with the host.

The processor 134 may control overall operation of the memory system 110. The processor 134 may drive firmware to control overall operation of the memory system 110. The firmware may be referred to as flash translation layer (FTL). Also, the processor 134 may be realized as a microprocessor or a central processing unit (CPU).

The processor 134 may drive the FTL to perform a foreground operation corresponding to a request received from the host. For example, the processor 134 may control a write operation of the memory device 150 in response to a write request from the host and control a read operation of the memory device 150 in response to a read request from the host.

Also, the controller 130 may perform a background operation onto the memory device 150 through the processor 134. For example, the memory device 150 may perform a garbage collection (GC) operation, a wear-leveling (WL) operation, a map flush operation, or a bad block management operation as a background operation.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may be driven through firmware referred to as a flash interface layer (FIL) in order to exchange data with the memory device 150.

The working memory 144 may store firmware code for driving the firmware. For example, when the memory system 110 is booted, the processor 134 may load the firmware code, stored in the firmware storage 152, into the working memory 144, The controller 130 may execute the firmware based on the loaded firmware code. For example, the host interface 132, the processor 134 and the memory interface 142 may execute a host interface layer (HIL), a flash translation layer (FTL) and a flash interface layer (FIL), respectively, based on the firmware code loaded into the working memory 144.

The buffer memory 146 may buffer data exchanged between the host 102 and the memory device 150. For example, the buffer memory 146 may buffer data provided from the host 102, and provide the memory device 150 with the buffered data. In addition, the buffer memory 146 may provide the host 102 with data outputted from the memory device 150.

A firmware binary file received from the host 102 in order to update the firmware may also be buffered in the buffer memory 146. As the firmware code in the firmware binary file is stored in the firmware storage 152, the firmware may be updated.

The working memory 144 and the buffer memory 146 may be implemented as volatile memories. For example, the working memory 144 and the buffer memory 146 may be implemented as static random access memories (SRAM) or dynamic random access memories (DRAM), FIG. 1 illustrates the working memory 144 and the buffer memory 146 disposed inside the controller 130; however, either or both of these memories may be disposed externally to the controller 130.

Figure 2:
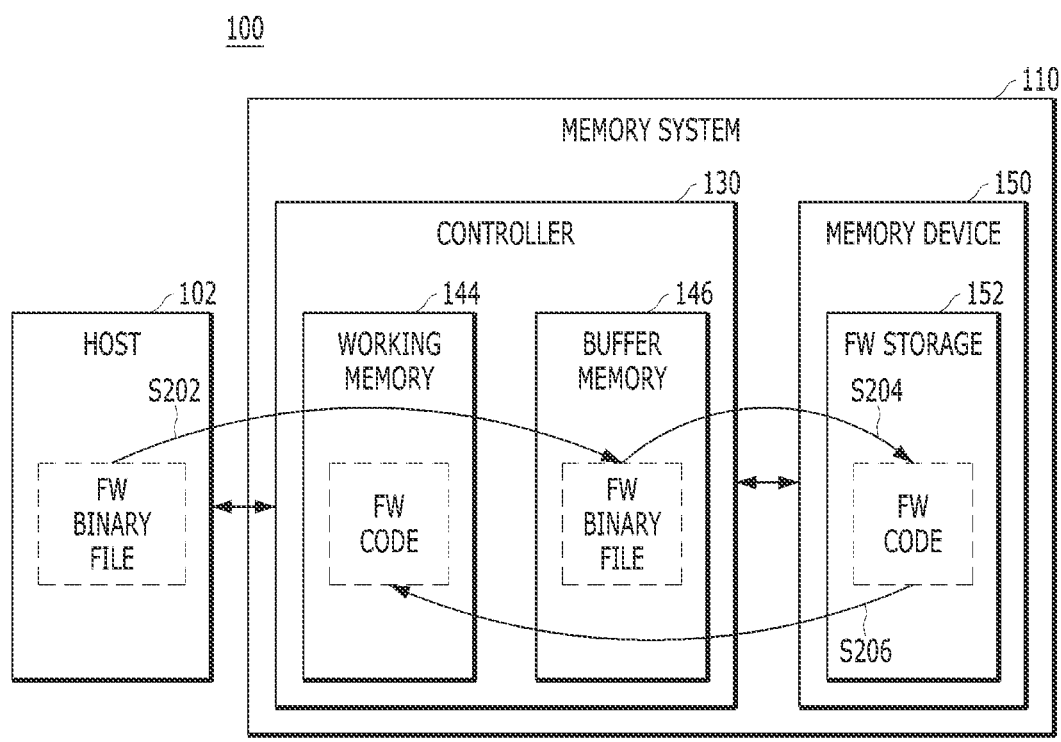
FIG. 2 is a block diagram illustrating a firmware update operation and an updated firmware execution operation.

FIG. 2 is a block diagram illustrating a firmware update operation and an updated firmware execution operation.

A host 102 and memory system 110 illustrated in FIG. 2 correspond to those described above with reference to FIG. 1. FIG. 2 focuses on configuration of the working memory 144 and the buffer memory 146 of the controller 130; other components of the controller 130 shown in FIG. 1 are omitted from FIG. 2 for clarity.

Operations S202 and S204 of FIG. 2 represent the firmware update operation, and operation S206 represents the firmware execution operation.

In operation S202, the host interface 132 may pre-install firmware in response to a firmware update request of the host 102. Such an operation of pre-installing the firmware (a firmware pre-installing operation) refers to an operation in which the host interface 132 buffers a firmware binary file, received with the firmware update request from the host 102, in the buffer memory 146.

In operation S204, a processor 134 may install the pre-installed firmware in the memory device 150. An operation of installing the firmware (a firmware installing operation) refers to an operation in which the processor 134 stores firmware code in the firmware binary file, buffered in the buffer memory 146, in a firmware storage 152.

The firmware may be updated through the firmware pre-installing and installing operations.

In operation S206, the processor 134 may load the firmware code, stored in the firmware storage 152, into the working memory 144, and execute the loaded firmware code.

Figure 3:
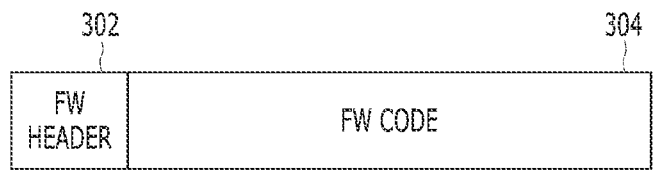
FIG. 3 is a diagram illustrating configurations of a firmware binary file.

FIG. 3 is a diagram illustrating configurations of a firmware binary file 300.

The firmware binary file 300 may include a firmware header 302 and firmware code 304. The firmware code 304 refers to source code that is loaded into the working memory 144 and executable in the processor 134. The firmware header 302 may include information on types of firmware corresponding to the firmware code.

For example, the types of firmware may include retention firmware and bridge firmware.

The retention firmware may be continuously stored in the firmware storage 152 and provide a normal function of the memory system 110.

The bridge firmware may be temporarily stored in the firmware storage 152 and provide a special function of the memory system 110. For example, the bridge firmware may further provide a function not provided by the retention firmware, and some of functions provided by the retention firmware may not be provided by the bridge firmware.

After the bridge firmware is not removed from the firmware storage 152 after the bridge firmware accomplishes its purpose, the bridge firmware may cause an error during a normal operation of the memory system 110.

For example, the bridge firmware may detect and recover a block, which is actually a normal block but designated as a runtime bad block (RTBB) during normal operation of the memory system 110. The function of recovering the mistakenly designated RTBB may include accessing the RTBB, which should not be performed during normal operation of the memory system 110. Thus, when the memory system 110 operates with the bridge firmware kept installed after it has accomplished it purpose, an error may occur in which the memory system 110 accesses a normal block mistakenly detected as an RTBB during the normal operation.

According to an embodiment of the present disclosure, when the host interface 132 pre-installs the bridge firmware in response to a bridge firmware update request, the processor 134 may install the bridge firmware only after retention firmware is pre-installed to replace the pre-installed bridge firmware when its purpose is accomplished. After pre-installing the retention firmware, the processor 134 may install the pre-installed bridge firmware. In addition, the processor 134 may load firmware code of the installed bridge firmware from the firmware storage 152 into the working memory 144 and execute the firmware code of the installed bridge firmware, After one-time execution of the installed bridge firmware, the processor 134 may remove the installed bridge firmware from the memory system 110 while installing the pre-installed retention firmware.

According to an embodiment of the present disclosure, right after the one-time execution of the bridge firmware, the bridge firmware is removed from the memory system 110 while the pre-installed retention firmware is installed. The removal of the bridge firmware right after the one-time execution of the bridge firmware may avoid an error caused by continuous execution of the bridge firmware during normal operation of the memory system 110. Therefore, reliability of the memory system 110 may be improved.

Figure 4:
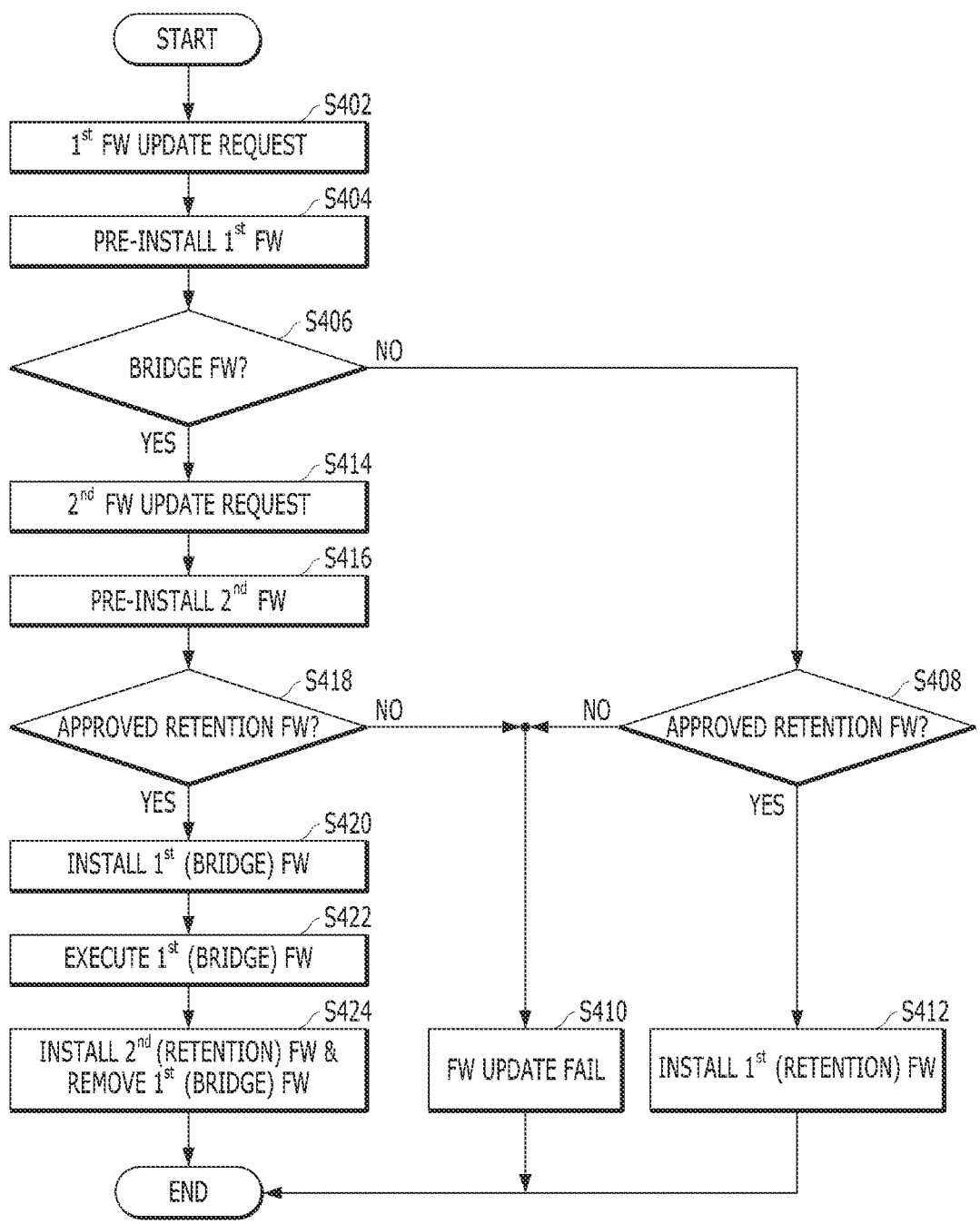
FIG. 4 is a flowchart illustrating an operation of a controller in accordance with an embodiment.

FIG. 4 is a flowchart illustrating an operation of the controller 130 in accordance with an embodiment.

In operation S402, the host interface 132 may receive an update request for first firmware from the host 102. Before the processor 134 installs the first firmware, operations of the controller 130 may be performed by executing previously-installed firmware.

In operation S404, the host interface 132 may pre-install the first firmware by receiving a first firmware binary file from the host 102 and buffering the first firmware binary file in the buffer memory 146.

In operation S406, the processor 134 may determine whether the pre-installed first firmware is bridge firmware. For example, the processor 134 may determine whether the first firmware is the bridge firmware based on a firmware header included in the first firmware binary file.

When the pre-installed first firmware is not bridge firmware (that is, "NO" in operation S406), the processor 134 may determine whether the pre-installed first firmware is approved retention firmware, in operation S408.

When the pre-installed first firmware is not approved retention firmware (that is, "NO" in operation S408), the processor 134 may not perform installation of the pre-installed first firmware, and provide the host 102 with a failure signal for the firmware update request through the host interface 132, in operation S410. Depending on implementation, the processor 134 may record a history of firmware update failure in the memory device 150.

When the pre-installed first firmware is approved retention firmware (that is, "YES" in operation S408), the processor 134 may install the pre-installed first firmware, which is the approved retention firmware, by storing a first firmware code, included in the first firmware binary file, in the firmware storage 152, in operation S412. The existing or previously-installed firmware may be removed after or while the first, i.e., retention firmware is installed. As code of the existing firmware stored in the firmware storage 152 is invalidated or erased, the existing firmware may be removed, Depending on implementation, the processor 134 may record a history of firmware update success in the memory device 150.

When the first firmware is the bridge firmware (that is, "YES" in operation S406), the processor 134 may suspend the installation of the bridge firmware until retention firmware of the bridge firmware is pre-installed.

In operation S414, the host interface 132 may receive an update request for second firmware from the host 102.

In operation S416, the host interface 132 may pre-install the second firmware by receiving a second firmware binary file from the host 102 and buffering the second firmware binary file in the buffer memory 146.

In operation S418, the host interface 132 may determine whether the pre-installed second firmware is approved retention firmware. For example, the processor 134 may determine whether the pre-installed second firmware is approved retention firmware based on a firmware header included in the second firmware binary file. In addition, the processor 134 may determine whether the pre-installed second firmware is approved retention firmware based on an electronic signature included in the second fir are binary file.

When the pre-installed second firmware is not approved retention firmware (that is "NO" in operation S418), the processor 134 may perform operation S410. That is, the processor 134 installs neither the pre-installed bridge firmware nor the pre-installed second firmware, but instead provides the host 102 with a failure signal for the firmware update request through the host interface 132.

When the pre-installed second firmware is approved retention firmware (that is "YES" in operation S418), the processor 134 may install the pre-installed first firmware, which is the bridge firmware, by storing the first firmware code, included in the first firmware binary file, in the firmware storage 152, in operation S420.

In operation S422, the processor 134 may load the installed first firmware code into the working memory 144. The controller 130 may execute the installed first firmware, which is the bridge firmware.

The processor 134 may completely execute the first firmware and remove the installed first firmware while installing the pre-installed second firmware, which is the approved retention firmware, in operation S424.

For example, the processor 134 may store second firmware code, included in the second firmware binary file buffered in the buffer memory 146, in the firmware storage 152, and invalidate or erase the installed first firmware code from the firmware storage 152.

Depending on implementation, the processor 134 may record the history of firmware update success in the memory device 150.

The second firmware binary file received from the host 102 may be a binary file for installing the same firmware as the previously-installed retention firmware or a binary file for installing the updated version of the retention firmware.

According to an embodiment of the present disclosure, when the bridge firmware is pre-installed, the processor 134 may install the bridge firmware on the premise that approved retention firmware is also pre-installed.

According to an embodiment of the present disclosure, since the bridge firmware may be replaced with approved retention firmware after the bridge firmware is installed and executed, the bridge firmware may not cause an error during normal operation of the memory system 110, Accordingly, reliability of the memory system 110 may be improved.

According to an embodiment of the present disclosure, a controller and an operating method of the controller may allow bridge firmware, which has to be only temporarily executed, to be removed from a memory system after the installed bridge firmware accomplishes its purpose.

According to an embodiment of the present disclosure, a controller and an operating method of the controller may prevent bridge firmware from remaining in a memory system and thus causing an error during normal operation of the memory system.

According to an embodiment of the present disclosure, a controller and an operating method of the controller may improve the reliability of a memory system by preventing bridge firm rare from causing an error.

While specific embodiments have been illustrated and described, it will be apparent to those skilled in the art that various changes and modifications may be made without departing from the scope of the invention. Therefore, the scope of the present invention is not limited to the described embodiments, but encompasses all variations that fall within the scope of the claims including their equivalents.

What is claimed is:
1. A controller that controls a memory device, comprising:
  a buffer memory; and
  a processor suitable for:
    temporarily storing bridge firmware data in the buffer memory when the bridge firmware data is received together with a previous firmware update request,
    installing and executing bridge firmware based on the bridge firmware data after approved retention firmware data is received together with a subsequent firmware update request,
    installing the approved retention firmware after execution of the bridge firmware, and
    removing the installed bridge firmware,
      wherein the processor removes the bridge firmware by invalidating bridge firmware code stored in a defined region of the memory device or controlling the memory device to erase the bridge firmware code from the defined region of the memory device;
      wherein the processor is further suitable for determining whether firmware data received together with the previous firmware update request is the bridge firmware data based on a firmware header included in the firmware data.

2. The controller of claim 1, wherein the processor is further suitable for:
- determining whether firmware data received together with the previous firmware update request is retention firmware data based on a firmware header included in the firmware data, and
- determining, when it is determined that the firmware data is the retention firmware data, whether the retention firmware data is the approved retention firmware data based on an electronic signature of the firmware data.

3. The controller of claim 2, wherein the processor is further suitable for outputting failure signals as responses to the previous and subsequent firmware update requests when it is determined that the retention firmware data is not the approved retention firmware data.

4. The controller of claim 1, wherein the processor installs the bridge firmware by storing the bridge firmware code, included in the bridge firmware data, in the defined region of the memory device.

5. The controller of claim 4, further comprising a working memory suitable for storing the bridge firmware code stored in the defined region to execute the installed bridge firmware.

6. The controller of claim 1,
- wherein the approved retention firmware enables the controller to perform a normal function, and
- wherein the bridge firmware provides a special function, not provided by the approved retention firmware and the normal function.

7. An operating method of a controller that controls a memory device, the operating method comprising:
- temporarily storing bridge firmware data in a buffer memory included in the controller, when the bridge firmware data is received together with a previous firmware update request;
- installing and executing bridge firmware based on the bridge firmware data after approved retention firmware data is received together with a subsequent firmware update request;
- installing the approved retention firmware after the execution of the bridge firmware; and removing the installed bridge firmware,
- wherein the removing of the installed bridge firmware includes invalidating bridge firmware code stored in a defined region of the memory device,
- controlling the memory device to erase the bridge firmware code from the defined region of the memory device;
- determining whether firmware data received together with the previous firmware update request is the bridge firmware data based on a firmware header included in the firmware data.

8. The operating method of claim 7, further comprising:
- determining whether firmware data received together with the subsequent firmware update request is retention firmware data based on a firmware header included in the firmware data; and
- determining, when it is determined that the firmware data is the retention firmware data, whether the retention firmware data is the approved retention firmware data based on an electronic signature of the firmware data.

9. The operating method of claim 8, further comprising outputting failure signals as responses to the previous and subsequent firmware update requests when it is determined that the retention firmware data is not the approved retention firmware data.

10. The operating method of claim 7, wherein the installing and executing of the bridge firmware includes installing the bridge firmware by storing the bridge firmware code, included in the bridge firmware data, in the defined region of the memory device.

11. The operating method of claim 10, wherein the installing and executing of the bridge firmware further includes loading the bridge firmware code, stored in the defined region, into a working memory included in the controller.

12. The operating method of claim 7,
- wherein the approved retention firmware provides a normal function of the controller, and the bridge firmware provides a special function not provided by the approved retention firmware and the normal function.

13. An operating method of a controller, the operating method comprising:
- pre-installing bridge firmware and retention firmware;
- installing the bridge firmware after the retention firmware is pre-installed; and
- removing the bridge firmware while or after installing the retention firmware after one-time execution of the bridge firmware,
- wherein the removing of the bridge firmware includes invalidating bridge firmware code stored in a defined region of the memory device,
- controlling the memory device to erase the bridge firmware code from the defined region of the memory device;
- wherein the processor is further suitable for determining whether firmware data received together with the previous firmware update request is the bridge firmware data based on a firmware header included in the firmware data.

* * * * *